United States Patent
Trim et al.

(10) Patent No.: US 10,893,302 B1
(45) Date of Patent: Jan. 12, 2021

(54) ADAPTIVE LIVESTREAM MODIFICATION

(71) Applicant: INTERNATIONAL BUSINESS MACHINES CORPORATION, Armonk, NY (US)

(72) Inventors: Craig M. Trim, Ventura, CA (US); Jeremy R. Fox, Georgetown, TX (US); Cesar Augusto Rodriguez Bravo, Alajuela (CR); Zachary A. Silverstein, Jacksonville, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/738,406

(22) Filed: Jan. 9, 2020

(51) Int. Cl.
| | |
|---|---|
| H04N 21/234 | (2011.01) |
| G06Q 50/00 | (2012.01) |
| G06N 3/02 | (2006.01) |
| H04N 5/28 | (2006.01) |
| H04N 21/2187 | (2011.01) |
| H04N 5/262 | (2006.01) |

(52) U.S. Cl.
CPC ............ *H04N 21/234* (2013.01); *G06N 3/02* (2013.01); *G06Q 50/01* (2013.01); *H04N 5/262* (2013.01); *H04N 5/28* (2013.01); *H04N 21/2187* (2013.01); *H04N 21/23418* (2013.01)

(58) Field of Classification Search
CPC ........ H04N 21/234; H04N 5/252; H04N 5/28; H04N 21/2187; H04N 21/23418; G06N 3/02; G06Q 5/01
USPC ......................................................... 348/576
See application file for complete search history.

(56) References Cited

U.S. PATENT DOCUMENTS

| | | | |
|---|---|---|---|
| 8,018,329 B2 | 9/2011 | Morgan et al. | |
| 9,396,354 B1 | 7/2016 | Murphy et al. | |
| 9,485,472 B2 | 11/2016 | Periyasamy et al. | |
| 10,334,303 B1 * | 6/2019 | Chung ............... | H04N 21/4222 |

(Continued)

FOREIGN PATENT DOCUMENTS

| | | |
|---|---|---|
| CN | 102656474 | 9/2012 |
| CN | 102687539 | 9/2012 |

OTHER PUBLICATIONS

Fidaleo et al., "The networked sensor tapestry (NeST): a privacy enhanced software architecture for interactive analysis of data in video-sensor networks", Proceedings of the ACM 2nd international workshop on Video surveillance & sensor networks, ACM, 2004, 8 pages.

(Continued)

*Primary Examiner* — Michael Lee
(74) *Attorney, Agent, or Firm* — William Hartwell; Andrew D. Wright; Roberts Calderon Safran & Cole, P.C.

(57) ABSTRACT

A computer-implemented method includes: receiving, by a computer device, original livestream video content from a livestreaming application on a first mobile device; receiving, by the computer device, a modification command from a second device located in a proximity of the first mobile device; modifying, by the computer device, the original livestream video content based on the modification command to create a modified livestream video content, the modified livestream video content being different from the original livestream video content; and transmitting, by the computer device, the modified livestream video content.

20 Claims, 7 Drawing Sheets

(56) References Cited

U.S. PATENT DOCUMENTS

| | | | |
|---|---|---|---|
| 2003/0108240 A1* | 6/2003 | Gutta | G06T 5/002 |
| | | | 382/181 |
| 2008/0198159 A1 | 8/2008 | Liu et al. | |
| 2010/0148947 A1 | 6/2010 | Morgan et al. | |
| 2012/0066722 A1* | 3/2012 | Cheung | H04N 21/4788 |
| | | | 725/62 |
| 2013/0260691 A1* | 10/2013 | Hintermeister | G06F 16/955 |
| | | | 455/41.2 |
| 2014/0195675 A1 | 7/2014 | Silver | |
| 2014/0333772 A1 | 11/2014 | Periyasamy et al. | |
| 2015/0109338 A1 | 4/2015 | McKinnon et al. | |
| 2016/0029166 A1 | 1/2016 | Meredith et al. | |
| 2017/0178512 A1* | 6/2017 | Kannon | G07C 5/08 |
| 2018/0068192 A1* | 3/2018 | Miller | G06K 9/00838 |
| 2018/0268240 A1* | 9/2018 | Loce | G06F 21/6254 |
| 2019/0171867 A1* | 6/2019 | Barnett | G06K 9/00288 |
| 2019/0174099 A1* | 6/2019 | Hodge | G08B 13/19647 |
| 2019/0180107 A1* | 6/2019 | Pham | G06T 7/194 |

OTHER PUBLICATIONS

Karlsen et al., "Probing privacy in practice: privacy regulation and instant sharing of video in social media when running", Proceedings of the 2016 International Conference on Advances in Computer-Human Interactions, 2016, 8 pages.

Anonymous, "A Semi-Automatic Method for Resolving Occlusions in Augmented Reality", https://members.loria.fr/MOBerger/lepetit/Occlusions/index.html, accessed Oct. 16, 2019, 5 pages.

Parthasarathy, "A Brief History of CNNs in Image Segmentation: From R-CNN to Mask R-CNN", https://blog.athelas.com/a-brief-history-of-cnns-in-image-segmentation-from-r-cnn-to-mask-r-cnn-34ea83205de4, Apr. 22, 2017, 23 pages.

Gandhi, "R-CNN, Fast R-CNN, Faster R-CNN, YOLO—Object Detection Algorithms", https://towardsdatascience.com/r-cnn-fast-r-cnn-faster-r-cnn-yolo-object-detection-algorithms-36d53571365e, Jul. 9, 2018, 11 pages.

Glassenberg et al., "Assisted Media Filtering", Department of Computer Science, Stanford University, accessed Jun. 12, 2019, 9 pages.

Mell et al., "The NIST Definition of Cloud Computing", NIST, Special Publication 800-145, Sep. 2011, 7 pages.

Dublin, "Video Streaming Market Worth USD 70.05 Billion by 2021—Online Video Streaming has Increased Viewership 60%—Research and Markets", CISION PR Newswire, May 12, 2016, 4 pages.

Liu, "Forecast augmented (AR) and virtual reality (VR) market size worldwide from 2016 to 2023", statista, Dec. 6, 2019, 2 pages.

* cited by examiner

ADAPTIVE LIVESTREAM MODIFICATION

BACKGROUND

Aspects of the present invention relate generally to livestream video and, more particularly, to controlling livestream video based on preferences of subjects in the vicinity of the device capturing the livestream video.

The occurrence of individual video streams such as livestreams has increased significantly. Further, augmented reality (AR) and video connections to live social media platforms are involving people at a social micro level in these livestreams.

SUMMARY

In a first aspect of the invention, there is a computer-implemented method including: receiving, by a computer device, original livestream video content from a livestreaming application on a first mobile device; receiving, by the computer device, a modification command from a second device located in a proximity of the first mobile device; modifying, by the computer device, the original livestream video content based on the modification command to create a modified livestream video content, the modified livestream video content being different from the original livestream video content; and transmitting, by the computer device, the modified livestream video content.

In another aspect of the invention, there is a computer program product including a computer readable storage medium having program instructions embodied therewith. The program instructions are executable by a computing device to cause the computing device to: receive original livestream video content from a livestreaming application on a first mobile device; receive a modify-livestream instruction from a second mobile device located in a proximity of the first mobile device; modify the original livestream video content based on the modify-livestream instruction indicating that the first mobile device is located within a first predefined distance from the second mobile device to create a modified livestream video content, the modified livestream video content being different from the original livestream video content; and transmit the modified livestream video content.

In another aspect of the invention, there is system including a processor, a computer readable memory, and a computer readable storage medium. The system includes program instructions to: receive original livestream video content from a livestreaming application on a first mobile device; receive a modification command from a second device located in a proximity of the first mobile device; modify the original livestream video content based on the modification command, the modification being a blocking of the original livestream video content; and not transmit the original livestream video content based on the blocking. The program instructions are stored on the computer readable storage medium for execution by the processor via the computer readable memory.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
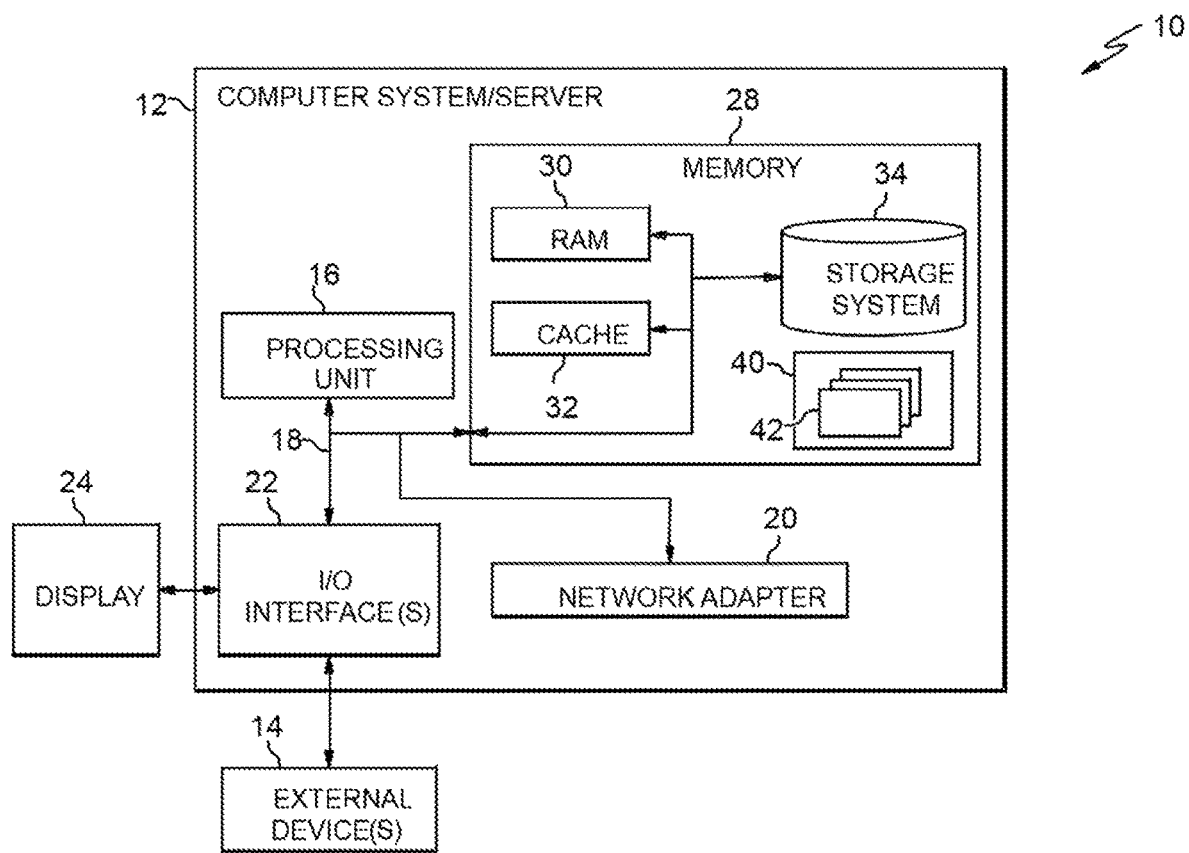
FIG. 1 depicts a cloud computing node according to an embodiment of the present invention.

Aspects of the present invention relate generally to livestream video and, more particularly, to controlling livestream video based on preferences of subjects in the vicinity of the device capturing the livestream video. According to aspects of the invention, a computer device is part of a service for presenting livestream video on a network such as, for example, the Internet. In embodiments, a livestream modification module of the computer device determines if a second device is transmitting a preference signal (that contains a modification command) within a defined proximity of a first mobile device that is livestreaming video. In embodiments, the livestream modification module modifies the livestream video transmitted by the computer device when the modification command is received by the livestream modification module. In embodiments, the livestream modification module blocks the livestream video from being transmitted by the computer device when the modification command is received by the livestream modification module. In this manner, implementations of the invention prevent a user of the second device from being included in the livestream video when the preference signal (containing the modification command) of the second device indicates a preference of not being included in livestream video.

As mentioned above, the occurrence of individual video streams such as livestreams has increased significantly. Further, AR and video connections to live social media platforms are involving people at a social micro level in these livestreams. With a very large number of people having these capabilities at practically all times, there is a concern for personal privacy and the risk of a party appearing in streams and videos against their wishes. Embodiments of the invention are applicable to livestreaming original video, AR and virtual reality (VR), amongst others.

Embodiments include a method for maintaining privacy during livestreams. The method includes: livestreaming audio/video content received from a livestreaming application on a first mobile device; receiving, from the livestreaming application on the first mobile device, an identification of a second mobile device in the proximity of the first mobile device that is broadcasting a predefined preference signal; and in response to determining that the predefined preference signal exceeds a predefined signal strength, thereby indicating a closeness of the second mobile device to the first mobile device, terminating the livestreaming. Embodiments of the invention include receiving and processing preference signals that indicate a trusted circle that is a group of particular first mobile devices (livestreaming devices) that are permitted to include the second mobile device (or the user of the second mobile device) in livestream audio/video content.

In some embodiments, the livestreaming device records (stores) the livestreaming video content and/or continues to capture and record unmodified and/or modified video after the livestreaming is modified or terminated. In other embodiments, the livestreaming device only livestreams (transmits in real-time) the livestream video content and does not record (store) the livestreaming video content for broadcasting at a later time.

In embodiments of the invention, a user (bystander) with a desired preference/privacy protection activates a security/preference signal on their device. In embodiments, the preference signal includes a modification command regarding any limitations the bystander places on their inclusion in livestreaming. Devices include personal devices such as mobile devices, laptop computers, tablets, AR headsets, etc. Devices include non-personal devices such as Internet of Things (IOT) beacons or any device that broadcasts a signal. In embodiments, the broadcasted signal includes Wifi, Bluetooth, near field communication (NFC), and other communication methods. In embodiments, the signal includes a machine readable alert identifying that the requested device/user has the preference of having their privacy protected. In embodiments, the bystander selects a desired privacy type (complete or targeted obfuscation). In embodiments, the desired privacy type is dependent on the geographical area of the livestreaming, the person conducting the livestreaming, and/or other factors.

In embodiments, the person conducting the livestreaming captures their livestream through an AR device or a mobile device. In embodiments, the livestream is a direct data feed connected through a centralized broadcasting service such as, for example, a social networking or video posting service. In embodiments, the livestreaming device captures current detectable communication channels including any broadcasted privacy/preference signals.

In embodiments, if the livestreaming device captures a privacy/preference signal, the livestreaming device attempts to detect distance (to the device broadcasting the signal) through signal strength, global positioning system (GPS) coordinates included in the signal, or other methods. In embodiments, a central broadcasting server (for example a computer device 100, discussed below) is queried by the livestreaming device for a ruleset that includes, for example, a rule that instructs the livestreaming device to not livestream (or modify the livestream) within 5, 10 or 15 feet (a predetermined distance) from a bystander's device. In embodiments, the central broadcast server applies the appropriate privacy type (full or targeted obfuscation) to the livestreaming. In embodiments, the central broadcast server stops (or otherwise modifies) the livestream as a result of a privacy signal being within the predetermined distance. In embodiments, upon the central broadcast server stopping the livestream, the central broadcast server disconnects from the livestreaming device and sends a communication to the bystander to inform the bystander that a livestreaming is being obfuscated. In embodiments, the central broadcasting server allows the livestreaming as a result of the privacy/preference signal being outside of the predetermined distance.

In embodiments, a central livestreaming service runs machine learning on profiles of registered livestreamers to programmatically rank the registered livestreamers who have a higher risk of violating preferences of bystanders and/or who may qualify for audits regarding violations of preference signals (or the modification commands in preference signals). In embodiments, this service is on an opt-in basis.

Embodiments provide predictive livestream blocking alerts that warn the livestreamer about the presence of known areas or known people that are already blocked. Embodiments include historical learning based on past data points. For example, embodiments simulate/predict future device blocking based on historical activity and recommend an expedited geographical path to the livestreamer based on a projected interest/need of the streaming event.

Implementations of the invention include features that are not well-understood, routine, or conventional activity in the relevant art. For example, a livestream modification module of a computer device receiving a modification command from a second mobile device and using the modification command to determine if a livestream video from a livestreaming device should be modified is not well-understood, routine, or conventional. In addition, implementations of the invention are an improvement to the technological field of livestream video capture in that a person captured by a livestream video who does not want their image in the livestream video can be automatically excluded from the livestream video.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
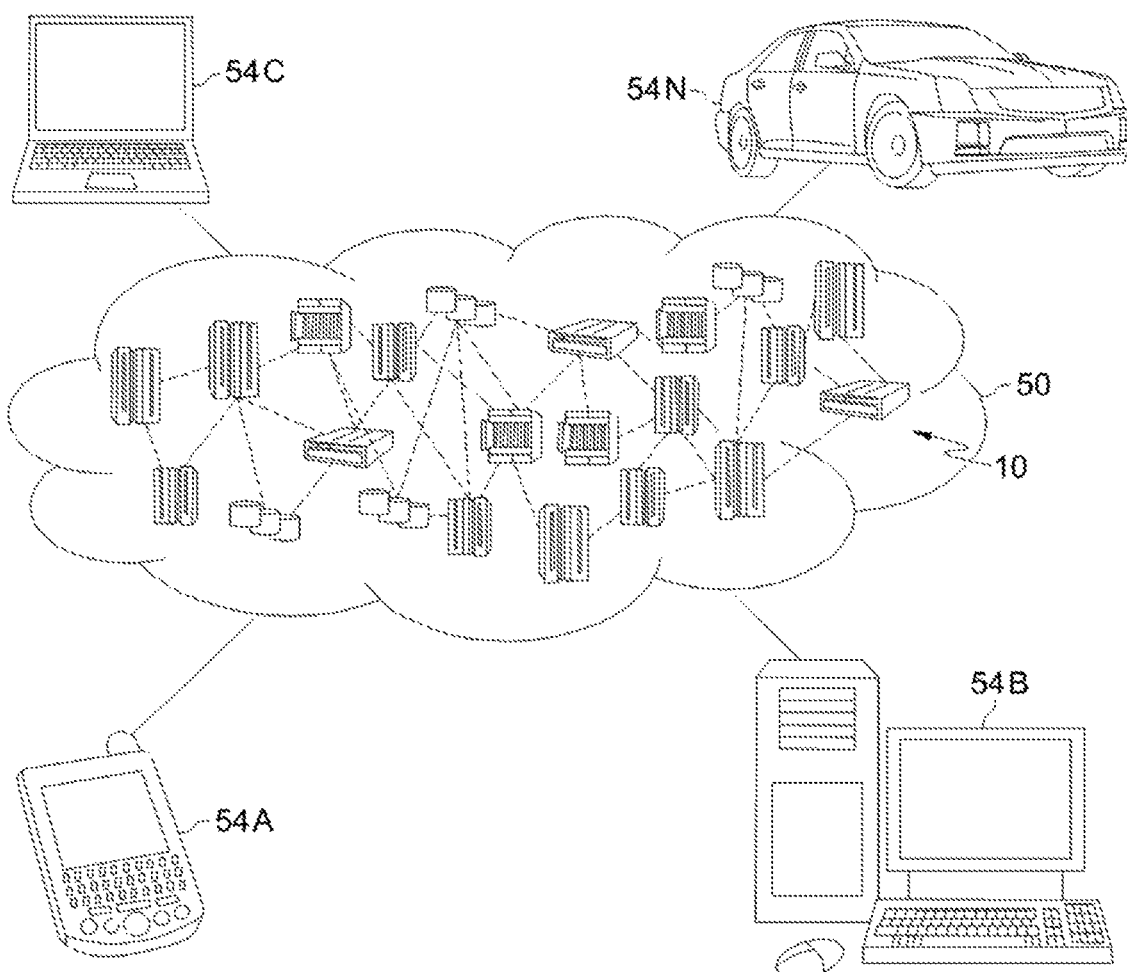
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
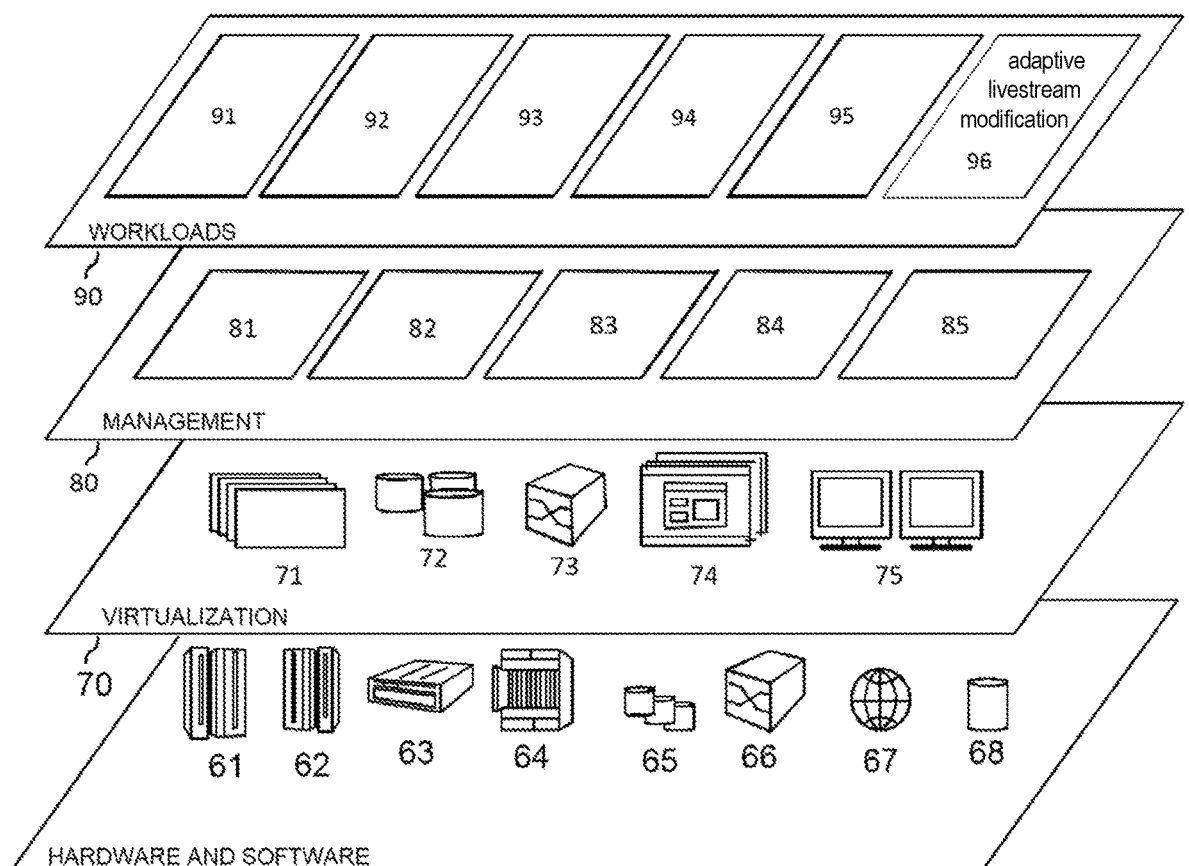
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and adaptive livestream modification 96.

Implementations of the invention may include a computer system/server 12 of FIG. 1 in which one or more of the program modules 42 are configured to perform (or cause the computer system/server 12 to perform) one of more functions of the adaptive livestream modification 96 of FIG. 3. For example, the one or more of the program modules 42 may be configured to: receive original livestream video content from a livestreaming application on a first mobile device; receive a modification command from a second device located in a proximity of the first mobile device; modify the original livestream video content based on the modification command to create a modified livestream video content, the modified livestream video content being different from the original livestream video content; and transmit the modified livestream video content.

To the extent implementations of the invention collect, store, or employ personal information provided by, or obtained from, individuals (for example, images, location information, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Figure 4:
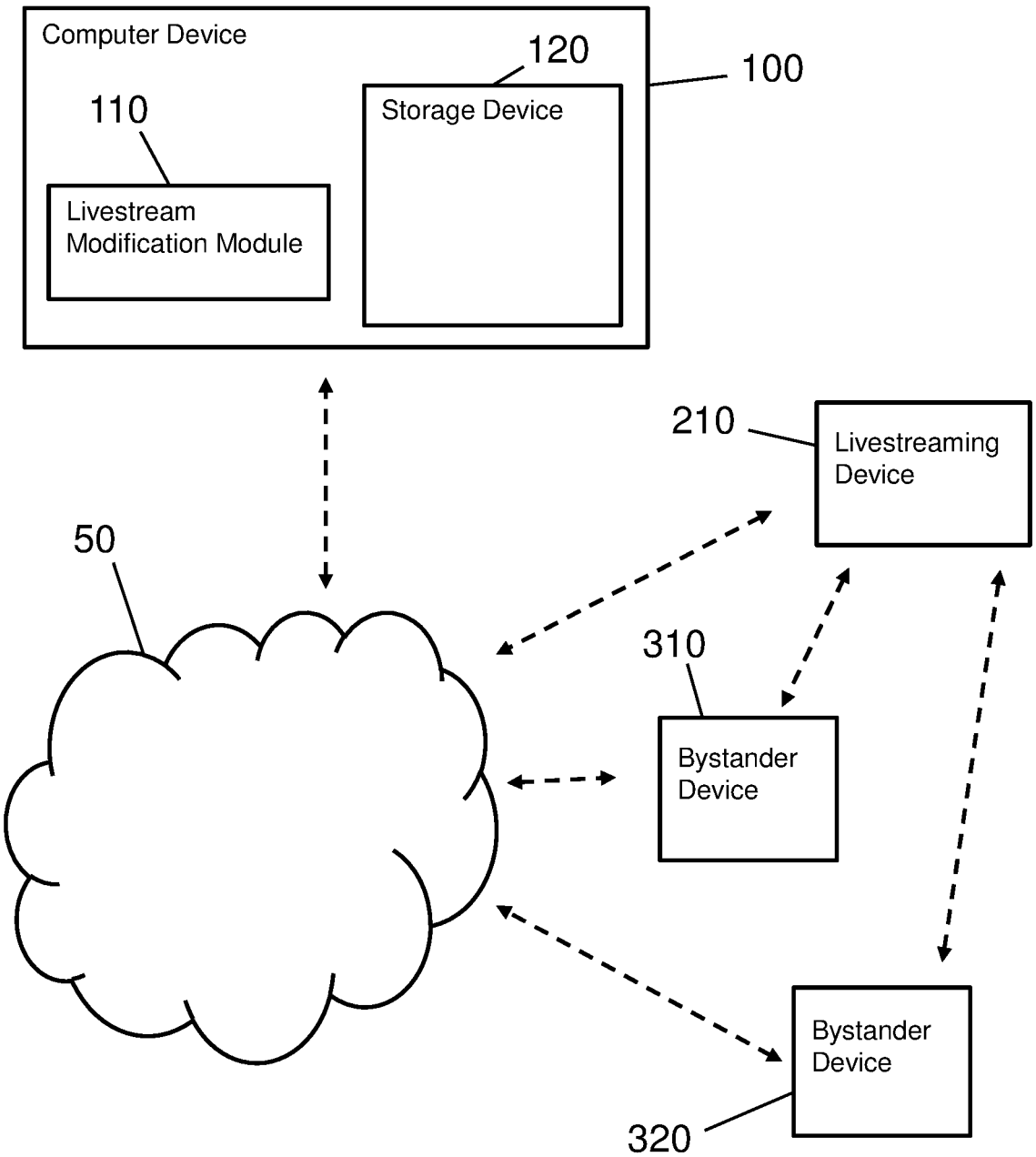
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1, that communicates over one or more networks such as, for example cloud computing environment 50. In this example, computer device 100 includes a livestream modification module 110, for example, one or more of program modules 42 in FIG. 1, and a storage device 120 such as, for example, storage system 34 in FIG. 1.

FIG. 4 shows a livestreaming device 210 such as, for example, personal digital assistant (PDA) or cellular telephone 54A in FIG. 2, that transmits livestream video over, for example, cloud computing environment 50 to computer device 100. In embodiments, the livestream video includes video images of a place or an event captured by livestreaming device 210 as a user of livestreaming device 210 submits the video images to a live social media service or other livestreaming service. Computer device 100 receives the livestream video transmitted from livestreaming device 210 and transmits the livestream video over one or more networks such as, for example, cloud computing environment 50. In embodiments, the livestream video is processed by livestream modification module 110.

FIG. 4 shows two bystander devices 310, 320 such as, for example, personal digital assistant (PDA) or cellular telephone 54A in FIG. 2, that are, for example, devices used by bystanders in the vicinity of livestream device 210. In embodiments, one or both of bystander devices 310, 320 are devices carried by a person, or attached to a vehicle, building, area of a building, or other object. For simplicity, bystander device 310 will be used in this description to represent one or more bystander devices. As described in detail below, in embodiments, livestream device 210 receives a preference signal transmitted by bystander device 310 when bystander device 310 is within a predetermined vicinity of livestream device 210. In embodiments, the term "vicinity" refers to a geographical vicinity, a signal strength vicinity, or some other form of indication of relative position of livestream device 210 and bystander device 310. In embodiments, the preference signal contains information (modification command) regarding preferences of bystander device 310 related to bystander device 310 being included in livestream video. For example, in embodiments, bystander device 310 has preference settings that indicate that bystander device 310 (or a user of bystander device 310) should not be included in any livestream video. In other embodiments, bystander device 310 has preference settings that indicate that the face of the user of bystander device 310 should not be included in any livestream video. Other embodiments include preference settings that limit inclusion of particular buildings, vehicles, portions of buildings (such as a doorway to a laboratory), or any other object.

Figure 5:
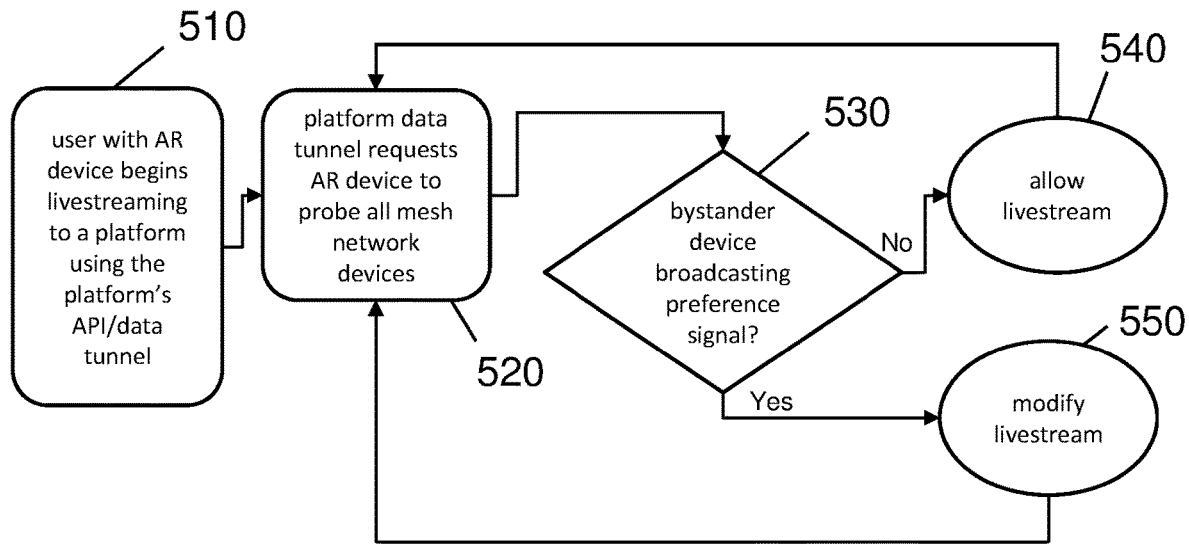
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4. Embodiments include mesh network broadcasting a signal interruption policy via Internet of Things (IOT), wireless local area networking (WLAN)(such as WiFi), and Bluetooth to AR devices.

At step 510, a user with an AR device begins livestreaming to a platform using the platform's application programming interface (API)/data tunnel. In embodiments, and as described with respect to FIG. 4, a user with an AR device, for example, livestreaming device 210 of FIG. 4, begins livestreaming to a platform, for example, a livestreaming platform running on computer device 100 of FIG. 4, using the platform's API/data tunnel, for example, an API on livestreaming device 210 or computer device 100 or FIG. 4.

At step 520, the platform API/data tunnel requests the AR device to probe all mesh network devices in the vicinity. In embodiments, and as described with respect to FIG. 4, an API on livestreaming device 210 probes bystander devices 310, 320 directly through Bluetooth connections for preferences regarding inclusion in a livestream video. In embodiments, and as described with respect to FIG. 4, an API on livestreaming device 210 probes bystander devices 310, 320 through a WLAN for preferences regarding inclusion in a livestream video. In embodiments, and as described with respect to FIG. 4, an API on computer device 100 probes bystander devices 310, 320 through a WLAN, cloud computing environment 50, or some other wireless network for preferences regarding inclusion in a livestream video.

At step 530, the AR device determines if any of the bystander devices are broadcasting a preference signal. In embodiments, and as described with respect to FIG. 4, livestreaming device 210 determines, based on the probing in step 520, whether either or both of bystander devices 310, 320 are broadcasting a preference signal. In embodiments, and as described with respect to FIG. 4, an API on computer device 100 determines, based on the probing in step 520, whether either or both of bystander devices 310, 320 are broadcasting a preference signal. In embodiments, the preference signal indicates a preference of bystander device 310 to modify the livestream video to exclude the user of bystander device 310. In embodiments, the preference signal of bystander device 310 indicates a preference of bystander device 310 to modify the livestream video to exclude only the face of the user of bystander device 310. In embodiments, the preference signal indicates a preference of bystander device 320 to modify the livestream video by halting (blocking) the livestream video.

If, at step 530, the AR device determines that no bystander device in the vicinity of the AR device is broadcasting a preference signal, then processing continues to step 540, where the livestream video is allowed. In embodiments, and as described with respect to FIG. 4, if neither of bystander devices 310, 320 is broadcasting a preference signal, then livestreaming device 210 is permitted to continue the livestreaming. If, at step 530, the AR device determines that one or more bystander devices in the vicinity of the AR device is broadcasting a preference signal, then processing continues to step 550, where the livestream video is modified. In embodiments, and as described with respect to FIG. 4, if either of bystander devices 310, 320 is broadcasting a preference signal, then the livestreaming is modified (partially blocked or halted) by livestreaming modification module 110 before the livestream video is transmitted over the Internet, for example, by computer device 100. As described above, in some embodiments, the modifying of the livestream video blocks only a portion of the livestream video. As described above, in some embodiments, the modifying of the livestream video blocks, or halts, the entire livestream video.

After processing of step 540 or step 550, processing continues to step 520 and the probing process is repeated to determine if any bystander devices are broadcasting a preference signal and/or if the presence of a preference signal has changed. In embodiments, and as described with respect to FIG. 4, the API on livestreaming device 210 probes bystander devices 310, 320 (and any other bystander devices in the vicinity) to determine the presence of a preference signal from any bystander device. In embodiments, this loop is repeated during the entirety of the livestreaming.

Figure 6:
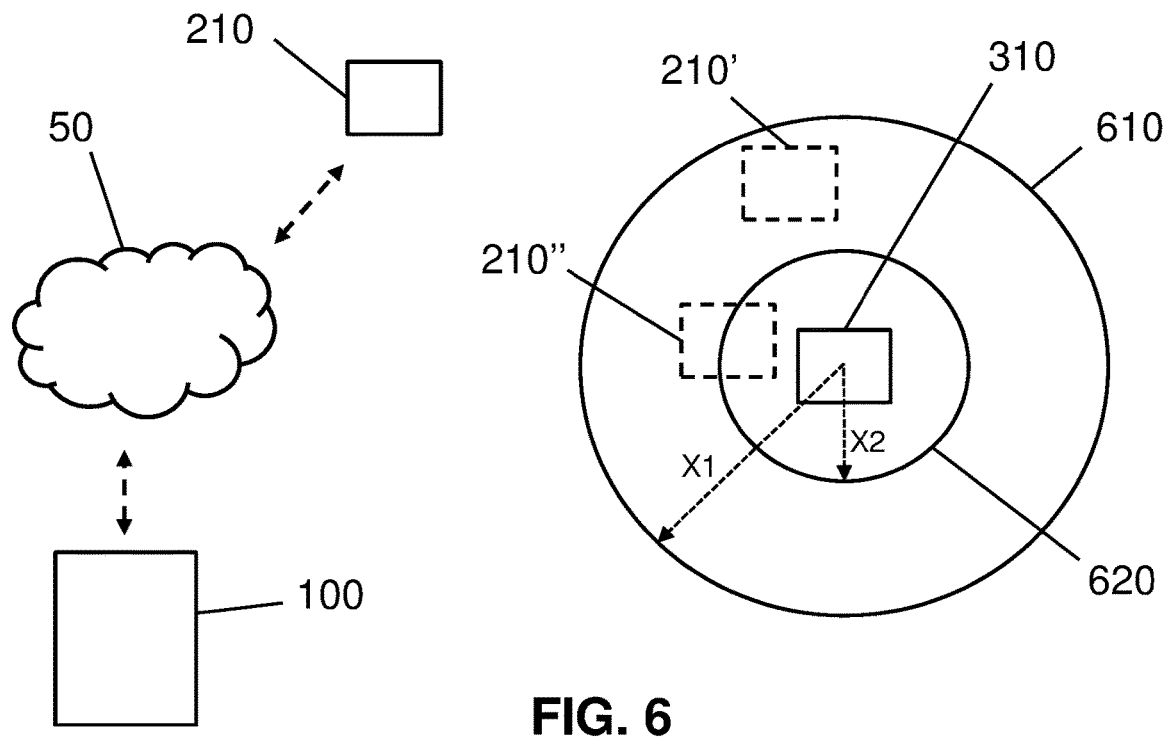
FIG. 6 shows a schematic diagram of an exemplary embodiment in accordance with aspects of the invention.

FIG. 6 shows an example of a warning zone and a modification zone around a bystander device. In this example, a user of bystander device 310 enables a preference signal on bystander device 310, for example a mobile phone. The preference signal reaches at least as far as the outer circle 610. In this example, a user of livestreaming device 210 is livestreaming a video in which the user of bystander device 310 does not want to be included. Along with the livestream video that livestreaming device 210 is sending to livestream modification module 110 (or some other part of computer device 100), livestreaming device 210 includes any preference signals within a detectable distance of livestreaming device 210.

In this example, when livestreaming device 210 reaches outer circle 610 (which is a distance X1 from bystander device 310), the preference signal is at a detectable distance, however the distance between livestreaming device 210 and bystander device 310 is not close enough (based on distance and/or signal strength) to warrant modifying the livestream video. In embodiments, distance X1 is called a warning distance and outer circle 610 is called a warning zone. Livestreaming device 210 is shown at position 210' inside warning zone 610. In embodiments, at position 210', livestreaming device 210 receives a warning from bystander device 310 that livestreaming device 210 is approaching a position where the livestream video will be modified. Upon receiving the warning signal, the user of livestreaming device 210 can decide whether to change paths to avoid getting any closer to bystander device 310, or continue getting closer to bystander device 310 and risk modification of the livestream video.

As the user reaches inner circle 620 (which is a distance X2 from bystander device 310), livestreaming device 210 is close enough (based on distance and/or signal strength) to bystander device 310 to warrant modifying the livestream video. In embodiments, distance X2 is called a modification distance and inner circle 620 is called a modification zone. Livestreaming device 210 is shown at position 210" crossing modification zone 620. In embodiments, when livestreaming device 210 is at position 210", bystander device 310 transmits a modification command as part of the preference signal. The modification command instructs livestream modification module 110 (either directly or through livestreaming device 210) to modify the livestream video. In embodiments, the modification command is a part of the preference signal, and is activated only when modification zone 620 is crossed by livestreaming device 210. In embodiments, warning distance X1 and modification distance X2 (or the signal strengths representing these distances) are determined by livestream modification module 110, bystander device 310, or a combination of livestream modification module 110 and bystander device 310.

In embodiments, livestream modification module 110 inserts a message on the livestream that advises watchers of the livestream that the livestream has been halted (or modified) so that the watchers will understand that the halting (or modifying) is not due to a technical difficulty. This feature reduces the number of watchers that stop watching the livestream because the watchers understand why the livestream is halted (or modified) and that (if applicable) the halting/modification is temporary.

In embodiments, computer device 100 applies targeted obfuscation by obfuscating a given person. In embodiments, this is achieved using a combination of regional convolutional neural networks (R-CNN), long short-term memory (LSTM) and image recognition. R-CNN provides the recognition of objects, the addition of LSTM enables the recognition in real time while also improving object accuracy, and image recognition provides the recognition of the person that will be obfuscated. The LSTM recognizes the same image in multiple frames of the video content in order to assist computer device 100 in recognizing a particular object as the same object in multiple frames of the video content. Other embodiments use R-CNN, LSTM, and geofencing (or other location mechanisms like, for example, beacons) to determine the person to be obfuscated. Other embodiments use R-CNN, LSTM, a network identifier, and an algorithm to detect distance based on the network to detect the user to be obfuscated (this is more effective in less crowded spaces). In embodiments, computer device 100 applies the methods above for occlusion on AR.

Figure 7:
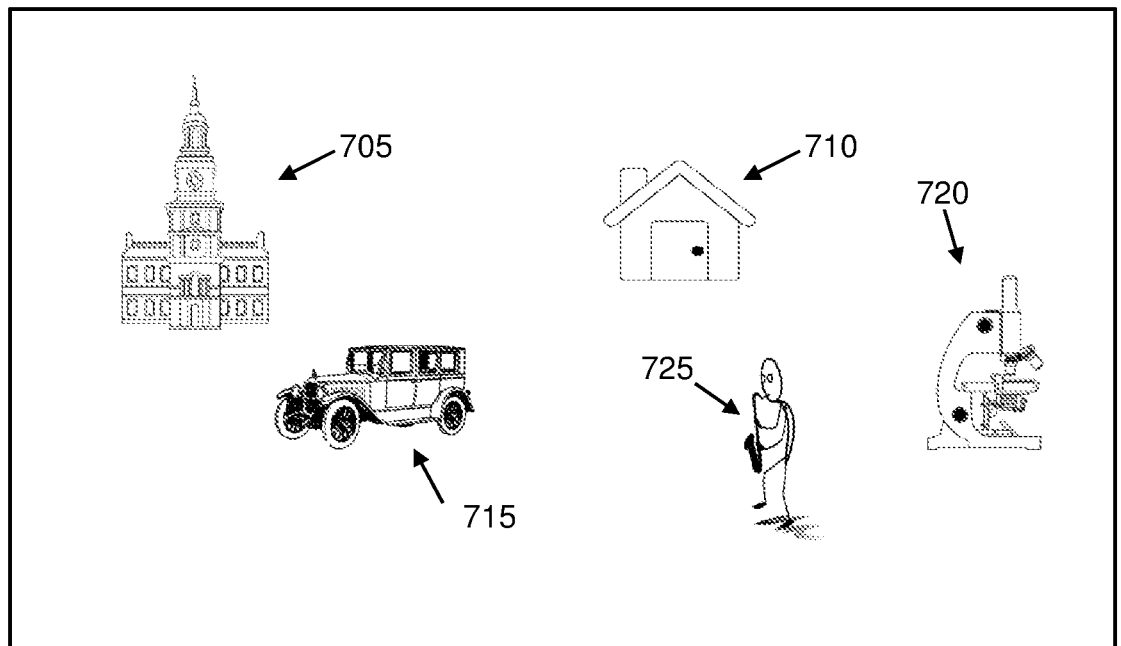
FIG. 7 shows a schematic example of video before modification in accordance with aspects of the invention.
Figure 8:
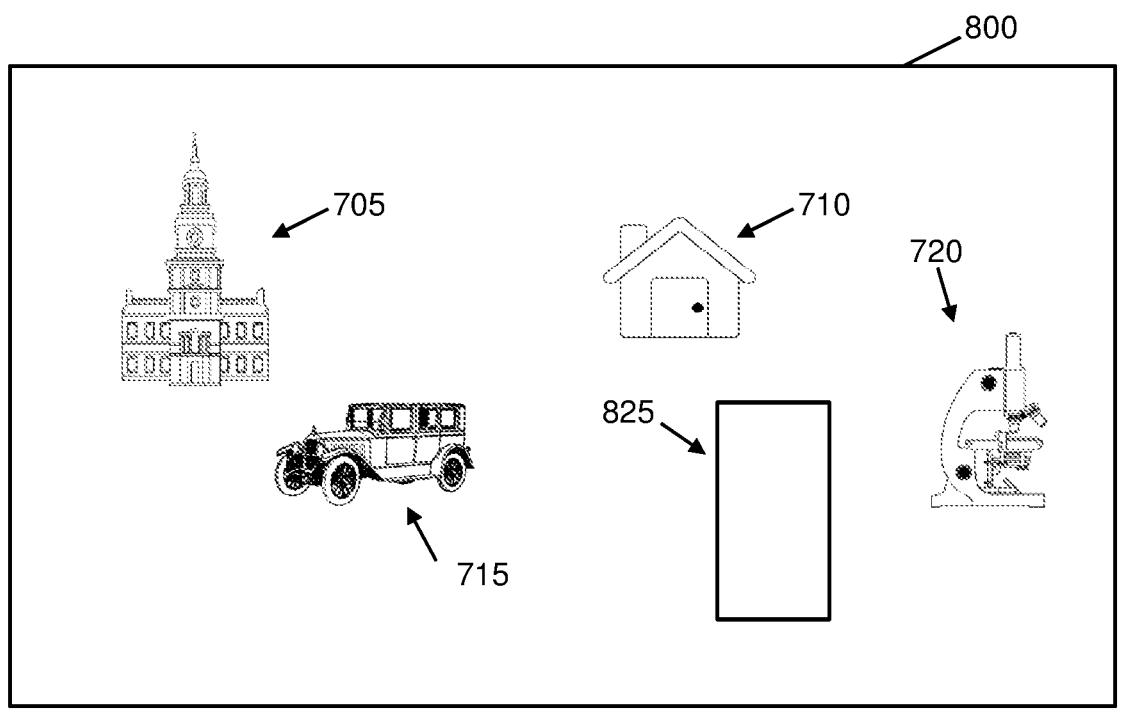
FIG. 8 shows a schematic example of video after modification in accordance with aspects of the invention.

FIGS. 7 and 8 show an example of a livestream video that is modified in accordance with embodiments of the invention. In FIG. 7, a livestream video 700 includes buildings 705 and 710, an automobile 715, a building location 720, and a person 725. No part of livestream video 700 is modified. In embodiments, livestream video 700 is livestreamed by livestreaming device 210 at positions 210 and 210' in FIG. 6, and person 725 is the user of bystander device 310.

In FIG. 8, a livestream video 800 includes all of the same objects as livestream video 700 in FIG. 7 except person 725. Livestream video 800 is modified by livestream modification module 110 to replace person 725 with an object 825 because person 725 has possession of bystander device 310 and bystander device 310 is broadcasting a preference signal. The livestream modified by livestream modification module 110 based on the modification command of the preference signal is broadcast by computer device 100 to other user devices over, for example, the Internet. In embodiments, livestream video 800 is livestreamed by livestreaming device 210 at position 210" in FIG. 6, and person 725 (the user of bystander device 310) is blocked out by object 825 in accordance with the modification command of bystander device 310. In embodiments, object 825 is a blank area of a particular color, a blurred or pixilated image of person 725, an overlay of adjacent background images, or some other object or imaging that obscures all or part of person 725 and/or the identity of person 725. In embodiments, a generic, or other, face is the object that obscures the face of person 715. In embodiments, a generic face stored in, for example, storage device 120, that has generic features is used to obfuscate the face of person 715 so that the impact on the livestream video is reduced by the obfuscation. The livestream modification module sizes and moves the generic face (or other stored face) to match the location and position of the face of person 715 to accurately replace the face of person 715 with minimal impact on the livestream video. In embodiments, object 825 is the same shape as person 725, a rectangle, or some other shape.

Although person 725 is the user of bystander device 310 in the example show in FIG. 8, in embodiments, bystander device 310 is attached to building 705, building 710, automobile 715, or building location 720 to provide a preference signal appropriate to the particular building, vehicle, building geographical location, etc. Embodiments are useful for restricted places, like government buildings and other geographical locations where livestreaming is prohibited or undesirable. Examples of places where livestreaming may be prohibited or undesirable are research laboratories to protect trade secrets and other intellectual property, school playgrounds, and hospitals. In embodiments, a particular geographically defined area is obfuscated based on GPS coordinates that define the area.

Figure 9:
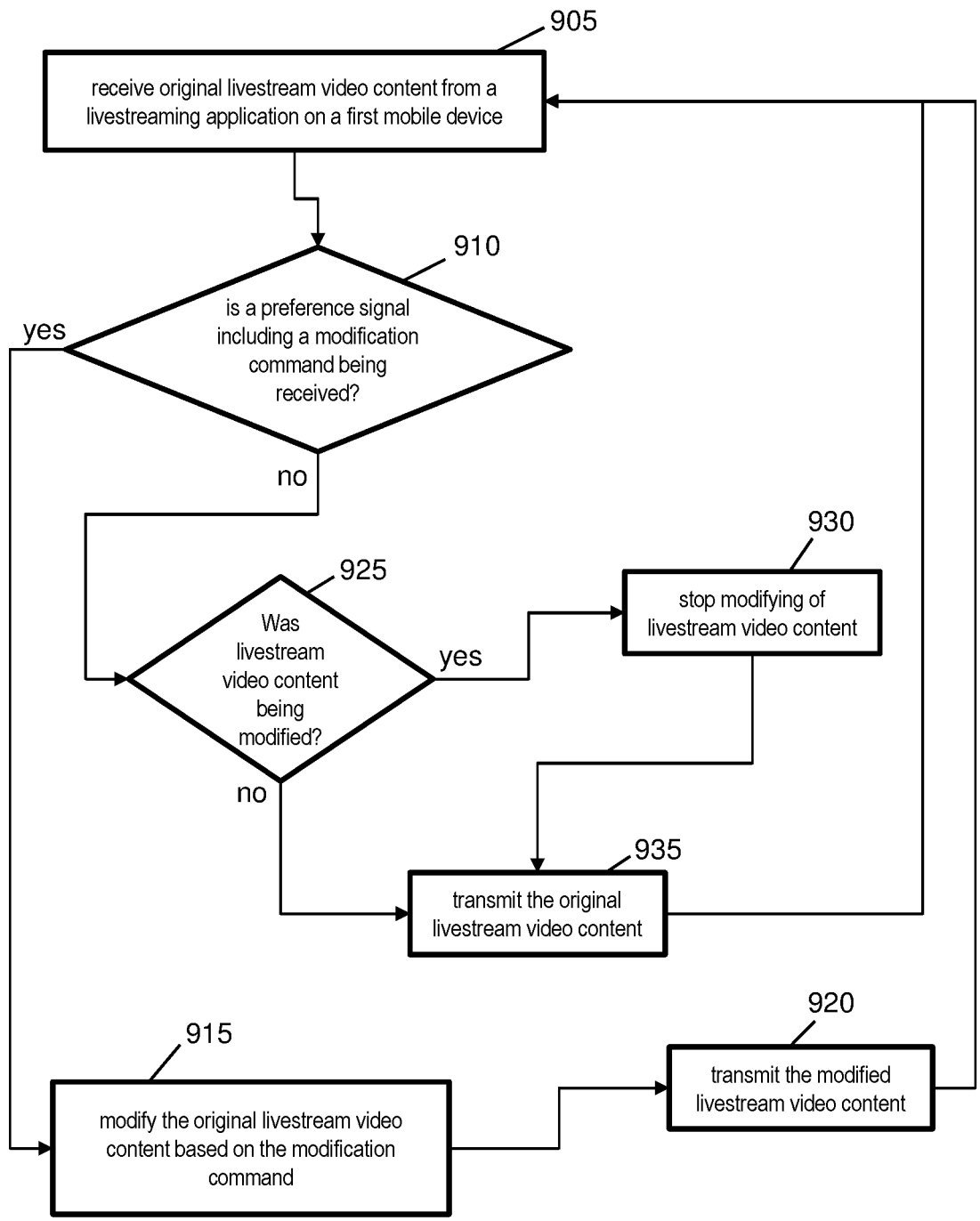
FIG. 9 shows a flowchart of an exemplary method in accordance with aspects of the invention.

FIG. 9 shows a flowchart of an exemplary method in accordance with aspects of the present invention. Steps of the method may be carried out in the environment of FIG. 4 and are described with reference to elements depicted in FIG. 4.

At step 905, the system receives original livestream video content from a livestreaming application on a first mobile device. In embodiments, and as described with respect to FIG. 4, livestream modification module 110 receives livestream video content from a livestreaming application on livestreaming device 210.

At step 910, the system determines if a preference signal including a modification command is being received by the first mobile device. In embodiments, and as described with respect to FIG. 4, livestream modification module 110 determines if livestreaming device 210 is receiving a preference signal from one or more bystander devices 310, 320. In embodiments, livestreaming device 210 sends the modification command of any received preference signals to livestream modification module 110 with the livestream.

If, at step 910, the system receives a modification command, processing continues to step 915, where the system modifies the original livestream video content based on the modification command. In embodiments, and as described with respect to FIG. 4, livestream modification module 110 modifies the original livestream video from livestreaming device 210 based on the modification command in the preference signal received from bystander device 310. Processing then proceeds to step 920, where the system transmits the modified livestream video content. In embodiments, and as described with respect to FIG. 4, livestream modification module 110 transmits the modified livestream video content over the Internet, for example, or halts the livestream. Processing then proceeds to step 905 where the above process is repeated for the duration of the livestreaming.

If, at step 910, the system does not receive a modification command, processing continues to step 925, where the system determines if the livestream video content is currently being modified. In embodiments, and as described with respect to FIG. 4, livestream modification module 110 determines if the livestream video content is currently modified/halted.

If, at step 925, the livestream video content is currently modified/halted, then processing continues to step 930, where the system stops modification of the livestream video content. In embodiments, and as described with respect to FIG. 4, livestream modification module 110 stops any modification of the livestream video content received from livestreaming device 210. Processing then proceeds to step 935.

If, at step 925, the livestream video content is not currently modified/halted, then processing continues to step 935, where the system transmits the original livestream video content. In embodiments, and as described with respect to FIG. 4, livestream modification module 110 transmits the original livestream video content received from livestreaming device 210 without modification. Processing then proceeds to step 905 where the above process is repeated for the duration of the livestreaming.

Embodiments include: systems that block livestreaming events if a preference request/signal is being broadcasted (using wireless signals) on a given range; methods that provide targeted obfuscation of a given person during a livestreaming event; systems that alert viewers when an obfuscation is being applied to a livestream, including the type of obfuscation (full or partial); systems that alert devices transmitting preference requests/signals that a livestreaming event is being obfuscated due to their preference request/signal (so that they can opt to disable the preference request/signal and allow the streaming); and systems and methods that continue to block/modify a livestream until the livestreaming device successfully exits the blocked area/range or until the device transmitting the preference requests/signal turn off the preference request setting.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

receiving, by a computer device, original livestream video content from a livestreaming application on a first mobile device;

receiving, by the computer device, a modification command from a second device located in a proximity of the first mobile device;

modifying, by the computer device, the original livestream video content based on the modification command to create a modified livestream video content, the modified livestream video content being different from the original livestream video content;

transmitting, by the computer device, the modified livestream video content; and sending, by the computer device, a communication to the second device indicating that the original livestream video content has been modified, wherein the modification command comprises a warning signal, the warning signal indicating that the first mobile device has entered a warning zone around the second device, the warning signal warns the first mobile device that the modifying will take place as a result of the first mobile device getting closer to the second device, the modification command comprises a modify-livestream signal, the modify-livestream signal instructing the computer device to perform the modifying, the modify-livestream signal is triggered by the proximity being within a first predefined distance, the warning signal is triggered by the proximity being within a second predefined distance, and

17 the first predefined distance is less than the second predefined distance.

2. The computer-implemented method of claim 1, wherein the modifying comprises obfuscating a portion of the original livestream video content, the obfuscated portion being less than an entirety of the original livestream video content.

3. The computer-implemented method of claim 2, wherein the obfuscated portion is an image of a portion of a person using the second device.

4. The computer-implemented method of claim 3, wherein the obfuscated portion is a face of the person using the second device, and
the face of the person using the second device is replaced, by the computer device, in the modified livestream video content with a replacement face that is different from the face of the person using the second device.

5. The computer-implemented method of claim 3, wherein the modifying comprises regional convolutional neural networks (R-CNN) to recognize the portion to be obfuscated, image recognition to recognize the person using the second device, and long short-term memory (LSTM) enabling at least one of the recognitions in real time.

6. The computer-implemented method of claim 2, wherein the obfuscated portion is a geographically defined area.

7. The computer-implemented method of claim 2, wherein the obfuscated portion is replaced, by the computer device, in the modified livestream video content with a replacement portion that is different from the obfuscated portion.

8. The computer-implemented method of claim 1, wherein the second device is a mobile device.

9. The computer-implemented method of claim 1, further comprising:
receiving, by the computer device, a second modification command from a third device located in a proximity of the first mobile device; and
modifying, by the computer device, the original livestream video content based on the second modification command.

10. The computer-implemented method of claim 1, further comprising stopping, by the computer device, the modifying in response to no longer receiving the modification command.

11. A computer program product, the computer program product comprising a computer readable storage medium having program instructions embodied therewith, the program instructions executable by a computing device to cause the computing device to:
receive original livestream video content from a livestreaming application on a first mobile device;
receive a modify-livestream instruction from a second mobile device located in a proximity of the first mobile device;
modify the original livestream video content based on the modify-livestream instruction indicating that the first mobile device is located within a first predefined distance from the second mobile device to create a modified livestream video content, the modified livestream video content being different from the original livestream video content;
transmit the modified livestream video content; and
send a communication to the second mobile device indicating that the original livestream video content has been modified,

18 wherein the modify-livestream instruction comprises a warning signal, the warning signal indicating that the first mobile device has entered a warning zone around the second mobile device,
the warning signal warns the first mobile device that the modifying will take place as a result of the first mobile device getting closer to the second mobile device,
the warning signal is triggered by the proximity being within a second predefined distance, and
the first predefined distance is less than the second predefined distance.

12. The computer program product of claim 11, wherein the modifying comprises obfuscating a portion of the original livestream video content,
the obfuscated portion is a face of the person using the second device, and
the face of the person using the second device is replaced, by the computer device, in the modified livestream video content with a replacement face that is different from the face of the person using the second device.

13. The computer program product of claim 12, wherein the indicating that the first mobile device is located within a first predefined distance from the second mobile device is determined by a signal strength of a modify-livestream signal containing the modify-livestream instruction.

14. A system comprising:
a processor, a computer readable memory, and a computer readable storage medium;
program instructions to receive original livestream video content from a livestreaming application on a first mobile device;
program instructions to receive a modification command from a second device located in a proximity of the first mobile device;
program instructions to modify the original livestream video content based on the modification command, the modification being a blocking of the original livestream video content;
program instructions to not transmit the original livestream video content based on the blocking; and
program instructions to recommend a geographical path to the first mobile device based on a projected interest of the original livestream video content,
wherein the program instructions are stored on the computer readable storage medium for execution by the processor via the computer readable memory.

15. The system of claim 14, wherein the modification command comprises a warning signal, the warning signal indicating that the first mobile device has entered a warning zone around the second device, and
the warning signal warns the first mobile device that the modifying with take place as a result of the first mobile device getting closer to the second device.

16. The system of claim 15, further comprising program instructions to stop the modifying in response to the system no longer receiving the modification command.

17. The system of claim 14, further comprising program instructions to send a communication to the second device indicating that the original livestream video content has been blocked; and
program instructions to receive from the second mobile device an instruction to disable the modification command.

18. The computer program product of claim 11, wherein the program instructions are executable to cause the computing device to transmit an alert to the second mobile device indicating that the original livestream video content is modified due to the modify-livestream instruction received from the second mobile device.

19. The computer program product of claim 18, wherein the program instructions are executable to cause the computing device to receive from the second mobile device an instruction to disable the modify-livestream instruction.

20. The computer program product of claim 19, wherein the program instructions are executable to cause the computing device to:
- provide predictive livestream blocking alerts that warn the first mobile device about the presence of a known area that is blocked from livestreaming, the blocking being based on historical activity; and
- recommend a geographical path to the first mobile device based on a projected interest of the original livestream video content.

* * * * *